3,192,212
3,6-DIAMINO-N-(2,2-DIALKOXYETHYL)-2-QUINOXALINECARBOXAMIDES
Arthur A. Santilli, Ardmore, and Thomas S. Osdene, Berwyn, Pa., assignors to American Home Products Corporation, New York, N.Y., a corporation of Delaware
No Drawing. Filed May 27, 1963, Ser. No. 283,576
2 Claims. (Cl. 260—250)

This invention relates to novel quinoxalinecarboxamides possessing useful pharmacological properties and is concerned more particularly with 3,6-diamino-2-quinoxalinecarboxamides having a 2,2-dialkoxyethyl substituent on the nitrogen atom of the carboxamide group, and, optionally, a lower alkyl group in the 7-position.

Preferred compounds in accord with this invention are represented by the following general formula:

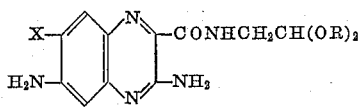

wherein R represents lower alkyl groups having up to 5 carbon atoms and X is hydrogen or a lower alkyl group having up to 5 carbons.

The compounds of this invention are prepared by reacting in an anhydrous alcohol such as ethanol, methanol or 2-ethoxyethanol, preferably in the presence of a basic catalyst such as sodium, stoichiometric amounts of 2,4-diamino-1-nitrosobenzene or 2,4-diamino-5-lower alkyl-1-nitrosobenzene with a 2-cyano-N-(2,2-dialkoxyethyl)acetamide. In this reaction, the reactants are refluxed until completion of the reaction and the reaction mixture is then allowed to slowly return to room temperature. The product is filtered off and purified by recrystallization from ethanol.

The following examples illustrate the practice of this invention:

EXAMPLE 1

*3,6-diamino-N-(2,2-diethoxyethyl)-2-quinoxalinecarboxamide*

To a stirred solution of 0.92 g. of sodium metal in 100 ml. of absolute ethanol was added 5.48 g. of 2,4-diamino-1-nitrosobenzene followed by 8.6 g. of 2-cyano-N-(2,2-diethoxyethyl)acetamide. The reaction mixture was boiled under reflux for 2 hours and was then allowed to stand overnight at room temperature. After cooling, the crystalline deposit was removed by filtration and amounted to 11.7 g., M.P. 158–162°. Recrystallization of the product from ethanol afforded 3,6-diamino-N-(2,2-diethoxyethyl)-2-quinoxalinecarboxamide, M.P. 158–9°.

*Analysis.*—Calculated: C=56.41, H=6.63, N=21.93. Found: C=56.12, H=6.57, N=22.12.

EXAMPLE 2

*3,6-diamino-N-(2,2-dimethoxyethyl)-2-quinoxalinecarboxamide*

Reaction of 5.48 g. of 2,4-diamino-1-nitrosobenzene with 7.4 g. of 2-cyano-N-(2,2-dimethoxyethyl)acetamide as in Example 1 affords 3,6-diamino-N-(2,2-dimethoxyethyl)-2-quinoxalinecarboxamide.

EXAMPLE 3

*3,6-diamino-7-methyl-N-(2,2-diethoxyethyl)-2-quinoxalinecarboxamide*

Reaction of 5.95 g. of 2,4-diamino-5-methyl-1-nitrosobenzene with 8.6 g. of 2-cyano-N-(2,2-diethoxyethyl)acetamide as in Example 1 affords 3,6-diamino-7-methyl-N-(2,2-diethoxyethyl)-2-quinoxalinecarboxamide.

EXAMPLE 4

*3,6-diamino-7-methyl-N-(2,2-dimethoxyethyl)-2-quinoxalinecarboxamide*

Reaction of 2,4-diamino-5-methyl-1-nitrosobenzene with 7.4 g. of 2-cyano-N-(2,2-dimethoxyethyl)acetamide, as in Example 1, affords 3,6-diamino-7-methyl-N-(2,2-dimethoxyethyl)-2-quinoxalinecarboxamide.

EXAMPLE 5

Reaction of 2,4-diamino-5-ethyl-1-nitrosobenzene with 2-cyano-N-(2,2-dipropoxyethyl ethyl)acetamide, as in Example 1, yields 3,6-diamino-7-ethyl-N-(2,2-diproproxyethyl)-2-quinoxalinecarboxamide.

EXAMPLE 6

Reaction of 2,4-diamino-5-propyl-1-nitrosobenzene with 2-cyano-N-(2,2-dibutoxyethyl)acetamide, as in Example 1, yields 3,6-diamino-7-propyl-N-(2,2-dibutoxyethyl)-2-quinoxalinecarboxamide.

EXAMPLE 7

Reaction of 2,4-diamino-5-pentyl-1-nitrosobenzene with 2-cyano-N-(2,2-dipentyloxyethyl)acetamide, as in Example 1, yields 3,6-diamino-7-pentyl-N-(2,2-dipentyloxyethyl-2-quinoxalinecarboxamide.

When tested pharmacologically, the compounds of this invention exhibited diuretic, anticonvulsant, antiinflammatory and antiviral activity, in particular against Herpes simplex. In addition, all these compounds are useful in exploring biological mechanisms in laboratory animals.

The compounds of this invention can be administered in a wide variety of oral or parenteral unit dosage forms, singly, or in admixture with other active compounds.

The present invention also includes the process of bringing the compounds thereof into a form suitable for therapeutic administration by associating them with liquid or solid, pharmaceutically acceptable carriers.

Various changes and modifications of this invention can be made by those skilled in the art to which it relates and to the extent that such variations incorporate the spirit of the invention, they are included in the scope of the claims.

What is claimed is:

1. A compound of the formula:

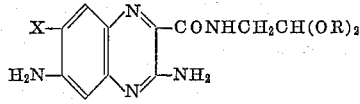

wherein X is selected from the group consisting of hydrogen and lower alkyl and R is a lower alkyl group.

2. 3,6 - diamino - N - (2,2 - diethoxyethyl) - 2 - quinoxalinecarboxamide.

References Cited by the Examiner

Osdene et al.: J. Chem. Soc., London (1955), pages 2027–31.

NICHOLAS S. RIZZO, *Primary Examiner.*